Aug. 1, 1961 G. SCHENKEL 2,994,745

DEVICE PRODUCING ARTIFICIAL REVERBERATION FOR
USE IN SOUND-REPRODUCTION INSTALLATIONS
Filed Nov. 14, 1955

INVENTOR
GERRIT SCHENKEL
BY [signature]
AGENT

United States Patent Office 2,994,745

Patented Aug. 1, 1961

2,994,745

DEVICE PRODUCING ARTIFICIAL REVERBERATION FOR USE IN SOUND-REPRODUCTION INSTALLATIONS

Gerrit Schenkel, Eindhoven, Netherlands, assignor, by mesne assignments, to North American Philips Company, Inc., New York, N.Y., a corporation of Delaware Filed Nov. 14, 1955, Ser. No. 546,756
Claims priority, application Netherlands Dec. 11, 1954
4 Claims. (Cl. 179—100.2)

This invention relates to a device producing artificial reverberation for use in sound-reproduction installations, in which use is made of an endless magnetic tape on which a part of the sound for direct reproduction is recorded and is subsequently added to the direct sound in a retarded manner via one or more scattered reproducing heads.

It is known to use a loop-shaped flexible tape for the endless magnetic tape.

Furthermore, it is known to use a radially symmetrical wheel which is rotatably mounted on a stationary spindle and is provided with magnetic recording material at its outer surface. Preferably, such a magnetic wheel will be made cylindrical, although other shapes, for example that of a truncated cone, may also serve the purpose. The magnetic material may be provided in many different ways on the preferably solid wheel. Thus, for example, the magnetic material may be provided in the form of powder on the outer surface of the wheel by means of a binder or an adhesive at the desired point. On the other hand, a prefabricated flexible loop-shaped tape of the aforesaid type may be used, which is secured to the outer periphery of the wheel.

In accordance with the present invention, the magnetic tape is constituted by the periphery of the turntable of a record-player. Although, for the sake of simplicity, the recording material will generally be provided at the outer periphery, the material may alternatively, if the turntable is flanged, be provided at the inner periphery of the turntable.

By the step in accordance with the invention, the owner of a record player is enabled in a fairly simple manner to avoid the comparatively costly magnetic wheel and any accessories, for example the driving motor, thus considerably reducing the total cost of the aforesaid device. Since a record player already comprises a generally cylindrical turntable, which is driven at a constant speed by the electric motor of the record player, it is only necessary to provide the shell of the turntable with the magnetic recording material in order that this turntable may serve as a magnetic wheel for the reverberation device. The economy is higher according as the device is simpler. In this respect, reference may be made to a device producing artificial reverberation intended for producing full, rich sound in a living room or a small hall, where a more extensive installation might be too costly. Provision of the recording material on the existing turntable or replacement of the latter by a prefabricated magnetic table yields a suitable part for a reverberation device, which may serve unchanged as a driving table for the records.

The value of the delay introduced into sound reproduction when using the device is not only determined by the relative position of the magnet heads but also by the speed of rotation of the magnetic tape. If, in a device in accordance with the invention, said tape is driven by the motor of the record player, the speed can only be varied to the customary values used in playing the records.

In view of greater variation in the choice of the speed of rotation of the turntable, the speed in playing records is different from that used in a device in accordance with the invention. This difference is ensured by employing the same driving motor for both purposes, which motor should either be continuously controllable in a range associated with the requirements imposed both on the rate of playing of the records and on the degree of delay, or has a constant speed and drives the turntable at will via intermediate gears of different diameter. Naturally, it is also possible to use a separate driving source besides the customary motor associated with the record player. In this connection it will be understood that when using in a device in accordance with the invention, the turntable simultaneously as a magnetic tape, during the playing of a record, an additional motor is useless. In fact, independent speed control is then not feasible, since the speed of rotation is determined by the record to be played.

The present invention relates to a turntable for use in the aforesaid device.

In order that the invention may be readily carried into effect, it will now be described with reference to the accompanying drawing, given by way of example, in which.

Figures 1, 2:
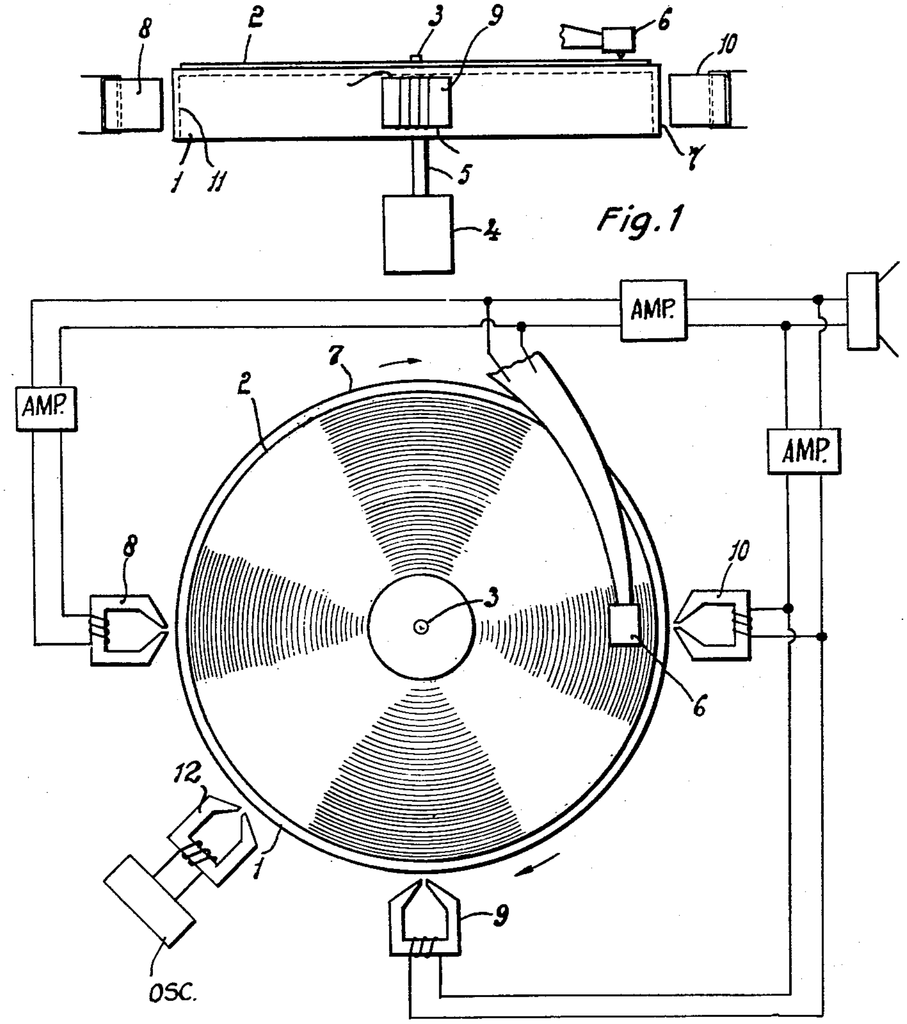
FIG. 1 is a side view of an embodiment of a turntable of a record player adapted for use in a device in accordance with the invention.
FIG. 2 is a plan view of the embodiment of the turntable of FIG. 1.

In the drawing, the reference numeral 1 denotes a turntable carrying a record 2 which is maintained in position by a pin 3. The turntable is driven from a motor 4 connected to the turntable through a spindle 5. The record is played by means of a pickup 6. In accordance with the invention, the turntable is used as a support of magnetic recording material for use in a device producing artificial reverberation in sound reproduction installations.

To this end the magnetic material is provided at the outer periphery 7 of the turntable around which magnet heads are arranged. As seen in FIG. 2, a part of the sound signal produced by pick-up 6 from the phonograph record, for direct reproduction on a speaker, is recorded via the recording head on magnetic tape. The reproduction of that part of the sound signal via head 8 on tape 7 is delayed by means of one or more reproducing heads 9 and 10 which are connected to the speaker. The number of emissions can still be increased by feeding back one or both reproducing heads to the recording head, thus once more recording the signal on the magnetic tape. Naturally, moreover, a greater number of reproducing heads may be used and with a view to varying the reverberation time they may be arranged to be movable in a tangential direction at the periphery of the turntable. If the magnetic recording material is provided at the inner periphery of the flange 11 the magnet heads should likewise be arranged at the inner side in order to save space.

Suitable erasing means known in the art, such as, for example, an erasing head 12, may be utilized. Such as erasing head is preferably positioned in operative proximity to the magnetic tape at a point between the reproducing head 9 and the recording head 8.

What is claimed is:

1. Sound reproducing apparatus for producing a reverberation effect, comprising a record turntable having a phonograph record thereon, said record having recorded sound thereon, a magnetic recording medium positioned on the periphery of said turntable, means positioned in operative proximity to said record for reproducing sound from said record, means positioned in operative proximity to said recording medium for recording said sound on the said recording medium, and means positioned in operative proximity to said recording medium for reproducing said sound from the said recording medium a predetermined period of time after the reproduction of the said sound from the said record.

2. Sound reproducing apparatus for producing a reverberation effect, comprising a record turntable having a peripheral flange, a phonograph record having sound recorded thereon positioned on said turntable, a magnetic tape positioned on said flange, means positioned in operative proximity to said record for reproducing sound from said record, means positioned in operative proximity to said tape for recording said sound on the said tape, and means positioned in operative proximity to said tape for reproducing said sound from the said tape a predetermined period of time after the reproduction of the said sound from the said record.

3. Sound reproducing apparatus for producing a reverberation effect, comprising a turntable having a phonograph record thereon, said record having recorded sound thereon, a magnetic recording medium positioned on said turntable, means positioned in operative proximity to said record for directly producing sound from said record, means positioned in operative proximity to said recording medium for recording a sound signal produced by said direct sound production means on said recording medium, and means connected to said direct sound production means positioned in operative proximity to said recording medium for reproducing said sound signal from the said recording medium a predetermined period of time after the direct production of the said sound from the said record.

4. Sound reproduction apparatus for producing a reverberation effect, comprising a turntable having a phonograph record thereon, said record having recorded sound thereon, a magnetic recording medium positioned on said turntable, means positioned in operative proximity to said record for directly producing sound from said record, means positioned in operative proximity to said recording medium for recording a sound signal on the said recording medium, and at least one means positioned in operative proximity to said recording medium for directly producing a secondary sound from said medium a predetermined time after the direct production of said sound from said record, whereby a primary and at least one secondary sound is produced from said record.

References Cited in the file of this patent

UNITED STATES PATENTS

| | | |
|---|---|---|
| 2,203,352 | Goldmark | June 4, 1940 |
| 2,512,015 | Graveel | June 20, 1950 |
| 2,625,611 | Roberts | Jan. 13, 1953 |
| 2,808,465 | Ham | Oct. 1, 1957 |